United States Patent

[11] 3,554,136

[72] Inventors Nels L. Falk;
Emanuel Val Verde, Chicago, Ill.
[21] Appl. No. 769,159
[22] Filed Oct. 21, 1968
[45] Patented Jan. 12, 1971
[73] Assignee Transco Inc.
Chicago, Ill.
a corporation of Delaware

[54] FREIGHT RETAINING DEVICE
3 Claims, 8 Drawing Figs.
[52] U.S. Cl. .................................................. 105/369
[51] Int. Cl. .................................................. B61d 45/00
[50] Field of Search ........................................... 105/369B, 376

[56] References Cited
UNITED STATES PATENTS
2,901,987  9/1959  Campbell et al. ............. 105/369(B)
3,115,102  12/1963  Rolfe, Jr., et al. ............. 105/369(B)
3,227,102  1/1966  Shook ........................... 105/369(B)
3,399,635  9/1968  Heard ........................... 105/369(B)
3,433,179  3/1969  Sharp ........................... 105/369(B)

Primary Examiner—Drayton E. Hoffman
Attorney—Edward C. Threedy

ABSTRACT: A freight retaining device adapted to be positioned between opposite vertical walls of a freight containing compartment which device comprises an elongated member having enlarged freight engaging surfaces and identical end connectors mounted on its opposite end edges with one of the end connectors telescopical with respect to the longitudinal length of the freight retaining member for accommodation in compartments of varying widths, and having a pair of oppositely directed spaced apart hook-shaped end portions for mounting to a fixed supporting rail of varying configurations.

PATENTED JAN 12 1971

3,554,136

INVENTOR.
NELS L. FALK &
EMANUEL VAL VERDE
BY Edward C. Threedy
THEIR ATTORNEY.

FREIGHT RETAINING DEVICE

SUMMARY OF THE INVENTION

A freight retaining device which is generally known in the industry as a swingboard is employed in the case, for example, of freight which consists of cardboard cartons that require large contact area between the device and the freight, thus our device comprises an elongated body portion having substantially enlarged flat freight engaging sidewalls. At either end of the device there are provided connector elements for positioning the device on generally horizontally extending supports carried by the confronting walls of the freight compartment. The connector elements comprise a horizontally extending vertically disposed yoke, the spaced arms of which terminate into opposed hook-shaped portions that define certain sidewalls of confronting interior grooves formed in the connector element. A center bar extends parallel to and between the spaced arms of the yoke, and has its free end in alignment with the rear wall surfaces of the interior grooves formed in the arms of the yoke. The rear of one of the yokes is formed to provide an enlarged channel-shaped base having a center pin extending therefrom in an opposite direction with respect to the center bar formed on the yoke face with such center pin adapted to be freely inserted through the coils of a spring which functions to telescopically connect the yoke to the end edge of the freight retaining device.

DETAILED DESCRIPTION

The invention will be best understood by reference to the accompanying drawings in which there is shown the preferred form of construction and in which.

Figures 1, 2:
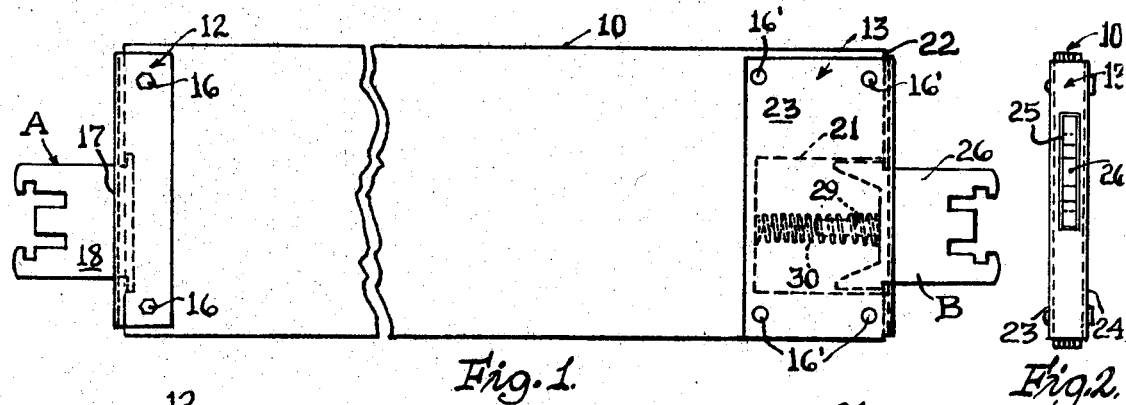
FIG. 1 is a side elevational view of the freight retaining device of this invention.
FIG. 2 is an end elevational view of the device.

In the storage or transit of freight it sometimes becomes necessary to employ a freight retaining device, such as is shown in the drawing, which presents enlarged freight engaging wall surfaces. These devices are known in the trade as swingboards, and as such are adapted to be positioned on supports provided by the freight compartment walls which supports also receive a crossbar or locking member such as disclosed in U.S. Pat. No. 2,896,554 dated Jul. 28, 1959, with such crossbar placed to one side of the swingboard to releasably hold the same in contact with the freight to be retained.

Figure 3:
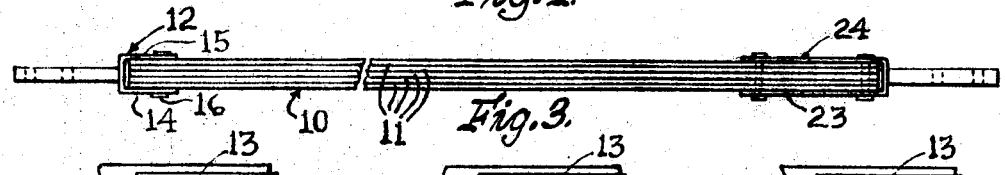
FIG. 3 is a top plan view of the freight retaining device.

The swingboard of this invention comprises a nonmetallic body 10, which may be of a single construction or comprises a plurality of elements 11 placed in facial abutment with respect to each other as is shown in FIG. 3.

To connect the individual elements 11 together into an integral unit there is provided at each end thereof a stirrup strip 12 and 13. The stirrup strip 12 is generally U-shaped and has its arms 14 and 15 placed in abutting relation with the opposite outer surfaces of the body 10 and by suitable fastening means such as flatheaded nuts and bolts 16 are connected thereto. The strip 12 in its exposed end edge is provided with an opening 17 through which projects a connector element 18. The connector element 18 comprises a yoke "A" which is provided with an enlarged base 19 which in turn provides flanged surface 20 that bears against the inner wall surfaces of the strip 12 which surround and define the opening 17 formed therein.

The opposite end of the body 10 of the swingboard as shown in FIG. 1 has formed therein extending inwardly from its exposed and edge portion 22 an enlarged opening 21. The stirrup strip 13 associated with the edge 22 of the body 10 is like the strip 12 generally U-shaped and connected to the body 10 by suitable fastening means 16' and provides enlarged sidewall sections 23 and 24, which embrace the outer wall surfaces of the body 10 and provide side covers for the opening 21 formed in the end edge 22 of the body 10, as seen in FIG. 1.

The stirrup strip 13 also provides a center opening 25 out of which projects the yoke end "B" of a connector element 26. The yoke end "B" provides an enlarged channel-shaped base member 27 which provides shoulders 28 adapted to bear upon the inner wall surfaces of the stirrup strip 13 about the opening 25 formed therein. The channel-shaped base 27 of yoke "B" is adapted to freely project into and be movable through the opening 21 formed in the end edge 22 of the body 10. The base 27 provides a center pin 29 which extends into the opening 21 and which is inserted within the coils of a compression spring 30 also contained within the opening 21 as shown in FIG. 1. By this construction the yoke end "B" of the connector element 26 is telescopically connected to the end 22 of the body 10.

Each of the yoke ends "A" and "B" is of the same configuration and, as such, provides side arms 31, 32 and 31', 32', respectively, which terminate at their free end into opposing hook-shaped ends 33 and 34. Formed inwardly of the hook-shaped ends 33 and 34 of each yoke end "A " and "B" are confronting interior grooves 35 and 36, which have their rear walls in alignment with the end of a center bar 37 which extends in a spaced parallel relation with respect to the side arms of the yoke end. The center bar 37 is separated from the side arms by elongated slots 38 and 39 which slots have certain opposite walls 38' and 39' in alignment with the confronting ends of the hook-shaped portions 33 and 34.

As seen in FIG. 1, the connecting end yokes "A " and "B" are connected to the body 10 beneath the center axis thereof.

Figures 4, 5, 6:
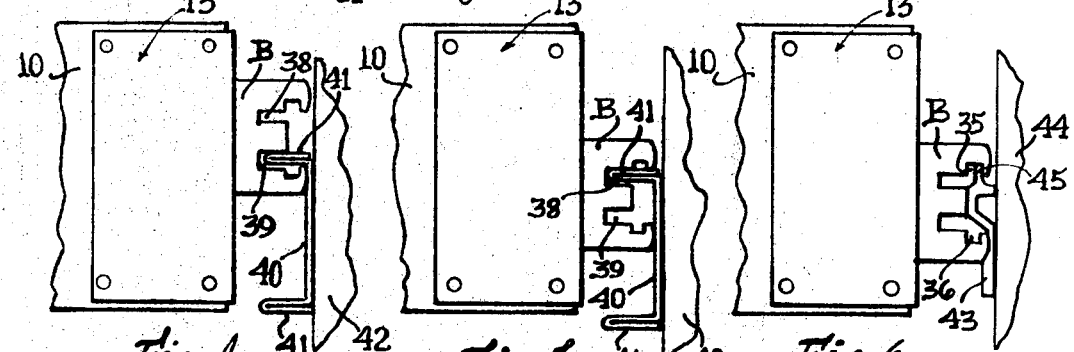
FIGS. 4, 5 and 6 are fragmentary side elevational views showing the universal adaptability of the connector element of the freight retaining device to different support configurations.
Figures 7, 8:
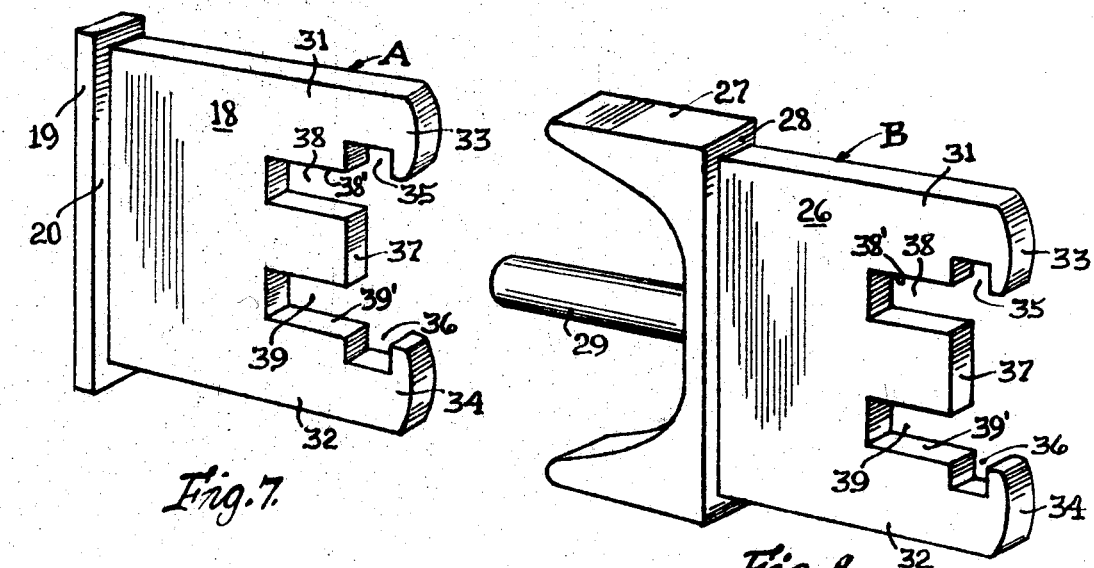
FIG. 7 is a perspective view of the fixed connector element as associated with the freight retaining device.
FIG. 8 is a perspective view of the telescopic connector element as associated with the freight retaining device.

The connecting end yokes "A" and "B" of the swingboard as shown in the drawings are universal in that they permit the swingboard to be attached to horizontally extending supports of varying configurations. As shown in FIGS. 4 and 5 the horizontal support 40 comprises a substantially U-shaped member having horizontally disposed support flanges 41. The support 40 is connected in any suitable manner to the walls 42 of the freight compartment and the swingboard is positioned thereon. In the instance shown in FIG. 4 the swingboard 10 has been inverted and the horizontal flange support 41 may be inserted into the other slot 39 formed in the yoke end "A," such as is shown in FIG. 5.

In FIG. 6 the swingboard and its yoke connector end "B" is shown attached to a support 43 that provides a vertically disposed horizontally extending flange 45, which when the yoke "B" is connected thereto is disposed in either of the interior grooves 35 or 36 as shown, thus permitting the swingboard to be connected thereto. In such a position the hook end 33 of the yoke "A " will permit movement of the swingboard longitudinally over the support 43, while preventing movement transversely thereof.

From the foregoing it is apparent that we have constructed a swingboard, the connecting ends of which are adapted to be attached to supports having various configurations without change in construction or location of the connector ends attached to the swingboard.

While we have illustrated and described the preferred form of construction for carrying our invention into effect, this is capable of variation and modification without departing from the spirit of the invention. We therefore, do not wish to be limited to the precise details of construction set forth, but desire to avail ourselves of such variations and modifications as come within the scope of the appended claims.

We claim:

1. In a freight-bracing device for freight compartments having supporting rails mounted on opposite sidewalls thereof including a swingboard mounted on and extending between a pair of such supporting rails, wherein the improvement comprises:

a. a substantially rectangularly shaped end connector on each end edge of the swingboard for mounting the swingboard to supporting rails of varying configurations;

b. stirrup strips embracing the end edges and portions of the sidewalls of the swingboard and providing in their end edge embracing portion an elongated rectangularly shaped opening through which a portion of said end connector freely projects in coaxial relation to one another and in an offset relation to the center longitudinal axis of the swingboard;

c. means provided by said end connectors for positioning behind the end edge of said stirrup strips that define the rectangularly shaped edge opening formed therein for connecting said end connectors to the end edges of the swingboard so that an end portion thereof extends longitudinally beyond said end edge of said swingboard;

d. means provided by said end portions of said end connectors for removably attaching said swingboard between supporting rails and for permitting rotation of the swingboard together with its end connectors through 180° about its center longitudinal axis and attachment between supporting rails in varying elevated planes; and e. said means including a pair of vertically aligned parallelly extending slots for receiving a horizontally disposed portion of the supporting rail and oppositely directed hook portions extending perpendicularly to and on either side of said slots for embracing a vertically disposed portion of the supporting rail for connecting the swingboard thereto.

2. In a freight-bracing device as defined by claim 1, wherein said means provided by said end connectors for positioning behind the end edge of said stirrup strips comprises a laterally extending shoulder of a length greater than the opening formed in the end edge of said stirrup strips, with said shoulder positioned behind the end edge of said stirrup strips that defines the opening therein so as to connect said end connector thereto.

3. A freight-bracing device as defined by claim 1 including means for telescopically connecting one of said end connectors to its corresponding stirrup strip so that the swingboard may accommodate freight compartments of varying widths.